United States Patent
Fainberg et al.

(10) Patent No.: US 12,267,343 B2
(45) Date of Patent: Apr. 1, 2025

(54) RISK DRIVEN PLANNING AND SIMULATION FOR A COMPUTER NETWORK

(71) Applicant: FORESCOUT TECHNOLOGIES, INC., San Jose, CA (US)

(72) Inventors: Eli Fainberg, Tel Aviv (IL); Yafit Maor, Even-Yehuda (IL)

(73) Assignee: Forescout Technologies, Inc., San Jose, CA (US)

( * ) Notice: Subject to any disclaimer, the term of this patent is extended or adjusted under 35 U.S.C. 154(b) by 301 days.

(21) Appl. No.: 17/711,613

(22) Filed: Apr. 1, 2022

(65) Prior Publication Data

US 2023/0319081 A1  Oct. 5, 2023

(51) Int. Cl.
*H04L 9/40* (2022.01)

(52) U.S. Cl.
CPC ...... *H04L 63/1425* (2013.01); *H04L 63/1416* (2013.01); *H04L 63/1433* (2013.01); *H04L 63/145* (2013.01); *H04L 63/20* (2013.01)

(58) Field of Classification Search
None
See application file for complete search history.

(56) References Cited

U.S. PATENT DOCUMENTS

| | | | | |
|---|---|---|---|---|
| 7,315,801 B1 * | 1/2008 | Dowd | ............... | H04L 63/1433 709/224 |
| 7,890,869 B1 * | 2/2011 | Mayer | ............... | G06F 21/577 709/224 |
| 11,411,822 B2 * | 8/2022 | Fainberg | ............... | H04L 63/0263 |
| 2006/0265324 A1 * | 11/2006 | Leclerc | ............... | H04L 63/1433 705/38 |
| 2017/0126727 A1 * | 5/2017 | Beam | ............... | H04L 63/1408 |
| 2018/0048668 A1 * | 2/2018 | Gupta | ............... | H04L 63/1425 |
| 2018/0115469 A1 * | 4/2018 | Erickson | ............... | H04L 41/12 |
| 2018/0139104 A1 * | 5/2018 | Seddigh | ............... | H04L 41/12 |
| 2019/0089742 A1 * | 3/2019 | Hill | ............... | H04L 63/1433 |
| 2019/0215246 A1 * | 7/2019 | Kawalay | ............... | H04L 41/147 |
| 2020/0007396 A1 * | 1/2020 | Fainberg | ............... | H04L 43/045 |
| 2020/0007397 A1 * | 1/2020 | Fainberg | ............... | H04L 41/0226 |
| 2020/0112485 A1 * | 4/2020 | Shen | ............... | H04L 41/147 |
| 2020/0351297 A1 * | 11/2020 | Seiver | ............... | H04L 63/101 |
| 2021/0006582 A1 * | 1/2021 | Yamada | ............... | H04L 63/1433 |
| 2021/0136101 A1 * | 5/2021 | Ben-Yosef | ............... | H04L 63/1433 |
| 2021/0152590 A1 * | 5/2021 | Urias | ............... | H04L 63/1425 |
| 2021/0306354 A1 * | 9/2021 | Raghuramu | ............... | H04L 63/1425 |
| 2021/0352099 A1 * | 11/2021 | Rogers | ............... | G06N 20/00 |
| 2022/0021697 A1 * | 1/2022 | Adamson | ............... | H04L 63/20 |
| 2022/0060512 A1 * | 2/2022 | Crabtree | ............... | G06F 16/951 |
| 2022/0067158 A1 * | 3/2022 | Sloane | ............... | G06F 21/568 |

(Continued)

*Primary Examiner* — Christopher C Harris
(74) *Attorney, Agent, or Firm* — Womble Bond Dickinson (US) LLP

(57) ABSTRACT

Systems, methods, and related technologies for a risk driven planning and simulation tool for a computer network are described. A security risk is determined for each of a plurality of devices on a network. A network traffic map is presented to a display. The network traffic map shows network traffic between the plurality of devices and the security risk for each of the plurality of devices. Segmentation of one or more of the plurality of devices on the network is simulated and presented to the display with updates to the network traffic or updates to the security risk of some of the devices on the network.

18 Claims, 6 Drawing Sheets

(56) References Cited

U.S. PATENT DOCUMENTS

2022/0083027 A1\* 3/2022 Brooks .................... G06F 9/455
2022/0239564 A1\* 7/2022 Jiang ....................... H04L 43/55
2022/0261714 A1\* 8/2022 Aslam ..................... G06F 30/20
2023/0042671 A1\* 2/2023 Zaman ................ H04L 63/1416

\* cited by examiner

RISK DRIVEN PLANNING AND SIMULATION FOR A COMPUTER NETWORK

TECHNICAL FIELD

Aspects and implementations of the present disclosure relate to network monitoring, and more specifically, to a risk driven planning and simulation tool for a computer network.

BACKGROUND

Computing devices may communicate with each over a computer network. In a computer network, computing devices can be communicatively coupled to each other over physically wired, optical, or wireless radio-frequency technology. A computer network can have a variety of network topologies. As technology advances, the number and variety of devices that communicate over computer networks increase, as does the amount of data and importance of such data on each computing device. Protection of computing devices and the data against malicious attacks, is a central concern. Computer networks may be analyzed and security risks may be mitigated.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
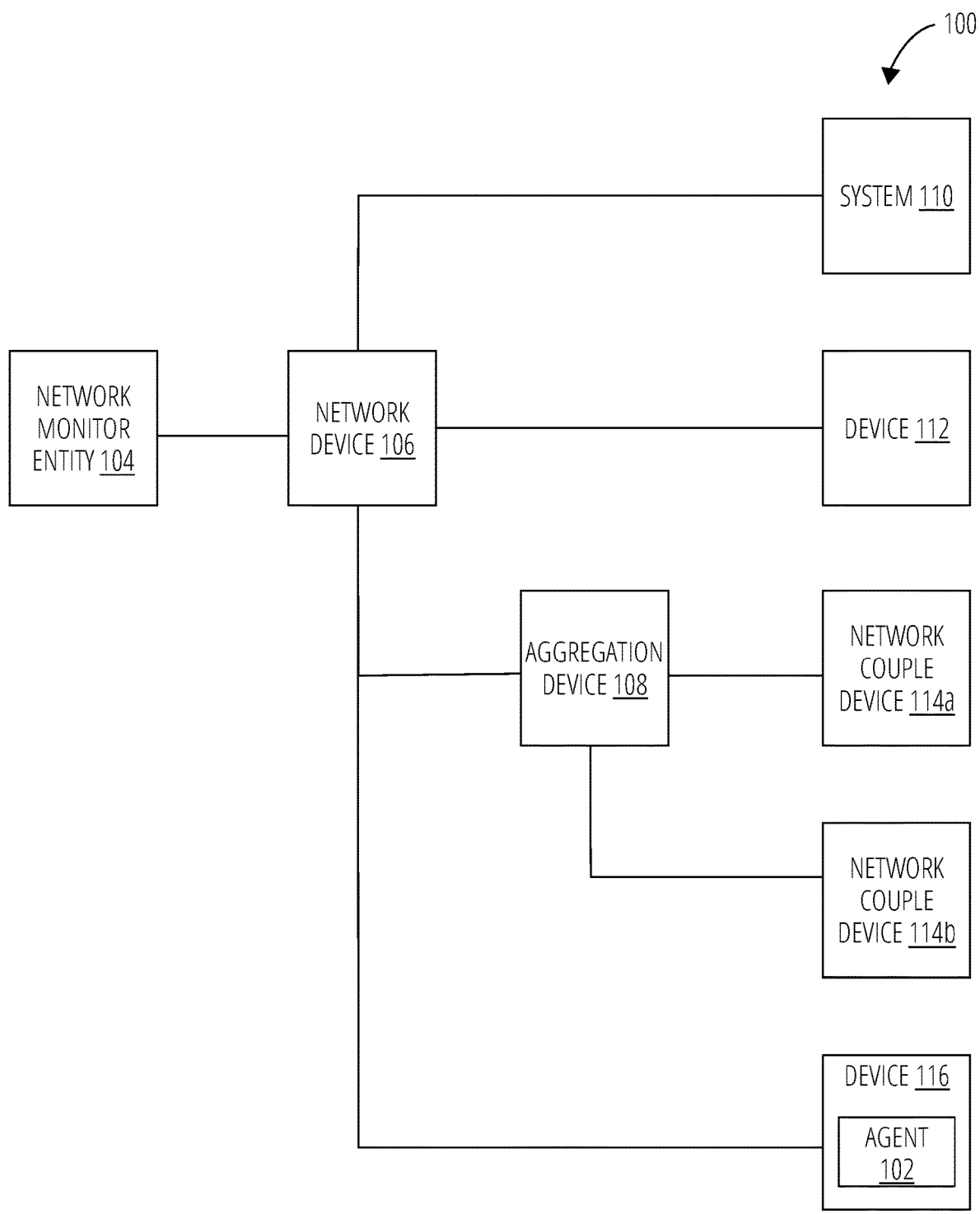
FIG. 1 depicts an example of a communication network in accordance with one implementation of the present disclosure.

Aspects and implementations of the present disclosure are directed to risk driven planning and simulation for a computer network. The systems and methods disclosed can be employed with respect to network security, among other fields.

Network segmentation divides a network into two or more segments or subnets, each acting as its own small network. This allows network administrators to control the flow of traffic between subnets based on granular policies. Organizations may use segmentation to improve monitoring, boost performance, localize technical issues, and enhance security.

Network segmentation can be implemented as either physical or logical segmentation. With physical segmentation a larger network may be divided into a collection of smaller subnets. A physical or virtual firewall acts as the subnet gateway, controlling which traffic comes in and goes out. With physical segmentation the topology of the network is fixed depending on how the devices are physically connected through wiring and switches, etc.

With logical segmentation, subnets may be created through virtual local area networks (VLANs) or network addressing schemes. VLAN-based approaches use VLAN tags to automatically route traffic to a given subnet. Network addressing schemes use the network addresses and rules to divide the network and route the data according to those divisions. Logical segmentation provides improved flexibility over physical segmentation because logical segmentation may be performed (e.g., or changed) without wiring or movement of a physical component.

Some network users may adopt a "Zero Trust" strategy. Zero Trust assumes, by default, that no device or user within a network is trustworthy, including those devices and users already inside the network perimeter. Zero Trust works on the principle of a "protect surface" which defines the assets (e.g., data) that are deemed to be valuable or sensitive to a user in a network.

Under existing solutions, a network may be segmented by an IT professional, in response to an attack. Such a retroactive approach may be ineffective, given that the system may be open to new types of attacks, and inefficient, given that it may require the IT professional to manually reconfigure hardware to modify the network architecture. Further, given the sheer size of an enterprise, an IT professional may not know where on the network to begin taking action (e.g., applying a segmentation policy, applying updates or patches, etc.), nor is it clear as to how to assess the risk of each device on the network. Segmenting one or more networks that span an entire enterprise may be a difficult undertaking. Such an endeavor may include a complex, multi-network, multi-tool, and multi-vendor solution. Due to the various considerations and risks, organizations are often reluctant to start such an effort due, which may result in delays that leave the network under-segmented and vulnerable to attach.

Further, existing solutions may not provide a visual representation of the enterprise that emphasizes areas of security risk in the network, or perform simulations with applied segmentation policies or other actions, to show a user how the network may react to a given action in advance. Further, existing solutions may not provide updated risk profiles of each device to provide the user with a real-time assessment of the security risks inherent in the network at various locations on the network (or networks). Further, existing solutions may fail to provide suggested actions that may be taken to improve security over one or more networks.

Accordingly, systems, methods, techniques, and related technologies are described herein in various implementations that includes a network monitor entity that may determine a security risk for each of a plurality of devices on a network. The network monitor entity may present a network traffic map to a display. The network traffic map shows network traffic between the plurality of devices and the security risk for each of the plurality of devices. The network monitor entity performs a simulation that includes applying a segmentation policy to one or more of the plurality of devices on the network. The network monitor entity presents the network traffic map with an update to the network traffic between the plurality of devices or an update to the security risk of one or more of the plurality of devices on the network (if changed), or both.

For example, the network monitor entity may recalculate, generate, or simulate the network traffic between devices with simulated segmentation policies which may reduce or filter out some communications between some of the devices. Further, the network monitor entity may recalculate the security risk of each device in view of the modified network traffic and other actions such as one or more simulated patches or updates are applied to some of the devices. The network traffic map, with the updated traffic flow in and out of each device, and the updated security risk of each device, is presented.

In some embodiments, a user may select a segmentation policy to apply in the simulation, to assess the effect of the segmentation policy as reflected through the network traffic map. The network monitor entity may present the network traffic map with a heat map of the security risk for each device, which may give the user an idea of where to start the segmentation journey. Further, the network monitor entity may determine a list of segmentation policy suggestions in view of the security risk of each device. The network monitor entity may present a network traffic map that is updated dynamically and with dynamically updated suggestions that reflects the changing needs and risks of the network.

It can be appreciated that the described technologies are directed to and address specific technical challenges and longstanding deficiencies in multiple technical areas, including but not limited to network security, monitoring, and policy enforcement. It can be further appreciated that the described technologies provide specific, technical solutions to the referenced technical challenges and unmet needs in the referenced technical fields.

Network segmentation can be used to enforce security policies on a network, for instance in large and medium organizations, by restricting portions or areas of a network which a device can access or communicate with. Segmentation or "zoning" can provide effective controls to limit movement across the network (e.g., by a hacker or malicious software). Enforcement points including firewalls, routers, switches, cloud infrastructure, or other network components or devices may be used to enforce segmentation on a network (and different address subnets may be used for each segment). Enforcement points may enforce segmentation by filtering or dropping packets according to the network segmentation policies/rules.

An entity or entities, as discussed herein, include devices (e.g., computer systems, for instance laptops, desktops, servers, mobile devices, IoT devices, OT devices, etc.), endpoints, virtual machines, services, serverless services (e.g., cloud based services), containers (e.g., user-space instances that work with an operating system featuring a kernel that allows the existence of multiple isolated user-space instances), cloud based storage, accounts, and users. Depending on the device, a device may have an IP address (e.g., a device) or may be without an IP address (e.g., a serverless service). Embodiments are able to dynamically (e.g., on the fly or responsive to changing conditions, for instance, a device being communicatively coupled to a network or in response to determination of characteristics of a device) control access of various entities or micro-segment various entities, as described herein.

The enforcement points may be one or more network devices (e.g., firewalls, routers, switches, virtual switch, hypervisor, SDN controller, virtual firewall, etc.) that are able to enforce access or other rules, ACLs, or the like to control (e.g., allow or deny) communication and network traffic (e.g., including dropping packets) between the device and one or more other entities communicatively coupled to a network. Access rules may control whether a device can communicate with other entities in a variety of ways including, but not limited to, blocking communications (e.g., dropping packets sent to one or more particular entities), allowing communication between particular entities (e.g., a desktop and a printer), allowing communication on particular ports, etc. It is appreciated that an enforcement point may be any device that is capable of filtering, controlling, restricting, or the like communication or access on a network. A segmentation policy or suggestion may include access rules that are determined to reduce a security risk of one or more devices on the network.

FIG. 1 depicts an illustrative communication network 100, in accordance with one implementation of the present disclosure. The communication network 100 includes a network monitor entity 104, a network device 106, an aggregation device 108, a system 110, devices 112 and 116, and network coupled devices 114a and 114b. The devices 112 and 116 and network coupled devices 114a and 114b may be any of a variety of devices including, but not limited to, computing systems, laptops, smartphones, servers, Internet of Things (I) or smart devices, supervisory control and data acquisition (SCADA) devices, operational technology (OT) devices, campus devices, data center devices, edge devices, etc. It is noted that the devices of communication network 100 may communicate in a variety of ways including wired and wireless connections and may use one or more of a variety of protocols.

Network device 106 may be one or more network devices configured to facilitate communication among aggregation device 108, system 110, network monitor entity 104, devices 112 and 116, and network coupled devices 114a and 114b. Network device 106 may be one or more network switches, access points, routers, firewalls, hubs, etc.

Network monitor entity 104 may be operable for a variety of tasks including determining data that is held on each of one or more devices on a network, determining a security risk of the device based at least on the data (e.g., whether or not the data is sensitive), and segmenting the network in response to if the security risk satisfies a threshold, such that accessibility to the offending device is reduced. In some embodiments, network monitor entity 104 can use local resources (e.g., processing, memory, data resources, or other resources), cloud resources, or a combination thereof for such an operation. In various embodiments, various libraries or an application programming interface (API) may be used to perform the operations of the network monitor entity 104.

Network monitor entity 104 can determine one or more enforcement points where the device is communicatively coupled to the network and thereby determine the one or more enforcement points closest to the device. For example, network monitor entity 104 may access information on a switch (e.g., a switch cache) to determine a port (e.g., physical port, wireless port, or virtual port) where a device with a particular IP address or MAC address or other identifier is communicatively coupled. Network monitor entity 104 may also access information from a wireless access point where the device is communicatively coupled. In some embodiments, network monitor entity 104 may poll information from a cloud service to determine where a device is communicatively coupled or connected to a network. In various embodiments, network monitor entity 104 access syslog or SNMP information from a device itself to determine where a device is communicatively coupled or connected to a network (e.g., without accessing information from a network device or enforcement point). Network monitor entity 104 supports applying access policies in situations where a device is communicatively coupled to a network with more than one connection (e.g., a wired connection and a wireless connection).

Based on the enforcement point, network monitor entity 104 may determine the one or more access rules to be assigned to the one or more enforcement points based on an access policy. In some embodiments, based on information about the one or more enforcement points closest to the device, network monitor entity 104 translates the access policy into one or more commands that will be used to configure the access rules on the one or more enforcement points. The closest enforcement point to a device can be enforcement point where the device is communicatively coupled. The enforcement point may be network device or network infrastructure device closest in proximity (e.g., physical proximity) to the device. The enforcement point comprises the port where the device is communitive coupled to the network, and communication to and from the device is sent first through that port. In some embodiments, the port of the enforcement point is the last point of communication within network infrastructure before communication is sent to the device. In various embodiments, the closest enforcement point is where communication from the device is initially sent when communications are sent from the device (e.g., prior to communications with the network backbone or Internet backbone). For example, the closest enforcement to a device connected to a switch is the switch. As another example, the closest enforcement point to a device wirelessly communicatively coupled to a wireless access point is the wireless access point. In various embodiments, network monitor entity 104 may access the current configuration of the one or more enforcement points to determine the access rules (e.g., ACLs) that are to be applied to the one or more enforcement points, as described herein. In some embodiments, a device is communicatively coupled to a wireless controller via a wireless access point and the wireless controller or a switch is the closest enforcement point (e.g., based on the wireless controller or the switch being able to apply access rules, for instance ACLs, to communications of the device, for instance, in the case where the wireless access point is not able to or does not have the functionality to apply access rules). In various embodiments, a device is communicatively coupled to a layer 3 switch via a layer 2 switch and the layer 3 switch is the closest enforcement point (e.g., based on the layer 3 switch being able to apply access rules, for instance ACLs, to communications of the device, for instance, in the case where the layer 2 switch is not able to or does not have the functionality to apply access rules).

Network monitor entity 104 may then apply or assign the access rules to the one or more enforcement points closest to the device. Network monitor entity 104 may communicate the access rules via application programming interfaces (APIs), command line interface (CLI) commands, Web interface, simple network management protocol (SNMP) interface, etc. In some embodiments, network monitor entity 104 may verify that the one or more enforcement points have been properly or correctly configured based on the access rules.

Network monitor entity 104 may provide an interface (e.g., a graphical user interface (GUI)) for simulation of risk-driven segmentation of devices on a network.

Network monitor entity 104 may further perform a variety of operations including identification, classification, and taking one or more remediation actions (e.g., changing network access of a device, changing the virtual local area network (VLAN), sending an email, sending a short message service (SMS) message, etc.).

Network monitor entity 104 may also parse network traffic. For example, the network monitor entity 104 may parse (e.g., read, analyze, access, etc.) different protocol fields of the network traffic (e.g., packets, messages, frames, etc.). The network monitor entity 104 may provide the field values of the protocol fields (e.g., values of certain portions of network packets, messages, frames, etc.) to one or more different processing engines (e.g., rule engines, machine learning models, etc.) that may request the protocol fields, as discussed in more detail below. The network monitor entity 104 may include a parser and one or more processing engines, as described herein.

An enforcement point may be a router, firewall, switch, hypervisor, software-defined networking (SDN) controller, virtual firewall, or other network device or infrastructure that may have an ACL like or rule like policy or functionality to apply based on the port where a device is communicatively coupled thereto. Enforcements points may also be a next generation firewall (NGFW) and cloud infrastructure. A NGFW can be updated with an ACL like policy regarding a device accessing the Internet. Cloud infrastructure (e.g., Amazon web services (AWS) security groups) can be updated to drop packets from the IP of the device that have a destination outside the cloud. Embodiments are operable to configure enforcement points at the edge of a network where a device is communicatively coupled thereto thereby controlling access of the device on a customized basis (e.g., customized or tailored for the device).

In some embodiments, if the categorization or characteristics functionality is being updated (e.g., which could result in a change in one or more access rules that are assigned to an enforcement point closest a device and thus impact the enforcement of an access policy by the enforcement points), notifications may be sent (e.g., via email or other methods as described herein) or presented to a user (e.g., via a graphical user interface (GUI)) to indicate that the categorization or characteristics of one or more entities is changing and should be confirmed before one or more enforcement points are updated based on the changed categorization or characteristics. After conformation, the access rules may be changed.

Network monitor entity 104 may be a computing system, network device (e.g., router, firewall, an access point), network access control (NAC) device, intrusion prevention system (IPS), intrusion detection system (IDS), deception device, cloud-based device, virtual machine based system, etc. Network monitor entity 104 may be communicatively coupled to the network device 106 in such a way as to receive network traffic flowing through the network device 106 (e.g., port mirroring, sniffing, acting as a proxy, passive monitoring, etc.). In some embodiments, network monitor entity 104 may include one or more of the aforementioned devices. In various embodiments, network monitor entity 104 may further support high availability and disaster recovery (e.g., via one or more redundant devices).

In some embodiments, network monitor entity 104 may monitor a variety of protocols (e.g., Samba, hypertext transfer protocol (HTTP), secure shell (SSH), file transfer protocol (FTP), transfer control protocol/internet protocol (TCP/IP), user datagram protocol (UDP), Telnet, HTTP over secure sockets layer/transport layer security (SSL/TLS), server message block (SMB), point-to-point protocol (PPP), remote desktop protocol (RDP), windows management instrumentation (WMI), windows remote management (WinRM), etc.).

The monitoring of entities by network monitor entity 104 may be based on a combination of one or more pieces of information including traffic analysis, information from external or remote systems (e.g., system 110), communication (e.g., querying) with an aggregation device (e.g., aggregation device 106), and querying the device itself (e.g., via an application programming interface (API), command line interface (CLI), web interface, simple network management protocol (SNMP), etc.). Network monitor entity 104 may be operable to use one or more APIs to communicate with aggregation device 108, device 112, device 116, or system 110. Network monitor entity 104 may monitor for or scan for entities that are communicatively coupled to a network via a NAT device (e.g., firewall, router, etc.) dynamically, periodically, or a combination thereof.

Information from one or more external or third party systems (e.g., system 110) may further be used for determining one or more tags or characteristics for a device. For example, a vulnerability assessment (VA) system may be queried to verify or check if a device is in compliance and provide that information to network monitor entity 104. External or third party systems may also be used to perform a scan or a check on a device to determine a software version.

Device 116 can include agent 102. The agent 102 may be a hardware component, software component, or some combination thereof configured to gather information associated with device 116 and send that information to network monitor entity 104. The information can include the operating system, version, patch level, firmware version, serial number, vendor (e.g., manufacturer), model, asset tag, software executing on a device (e.g., anti-virus software, malware detection software, office applications, web browser(s), communication applications, etc.), services that are active or configured on the device, ports that are open or that the device is configured to communicate with (e.g., associated with services running on the device), media access control (MAC) address, processor utilization, unique identifiers, computer name, account access activity, etc. The agent 102 may be configured to provide different levels and pieces of information based on device 130 and the information available to agent 102 from device 116. Agent 102 may be able to store logs of information associated with device 116. Network monitor entity 104 may utilize agent information from the agent 102. While network monitor entity 104 may be able to receive information from agent 102, installation or execution of agent 102 on many entities may not be possible, e.g., IoT or smart devices.

System 110 may be one or more external, remote, or third party systems (e.g., separate) from network monitor entity 104 and may have information about devices 112 and 116 and network coupled devices 114a and 114b. System 110 may include a vulnerability assessment (VA) system, a threat detection (TD) system, endpoint management system, a mobile device management (MDM) system, a firewall (FW) system, a switch system, an access point system, etc. Network monitor entity 104 may be configured to communicate with system 110 to obtain information about devices 112 and 116 and network coupled device 114a and network couple device 114b on a periodic basis, as described herein. For example, system 110 may be a vulnerability assessment system configured to determine if device 112 has a computer virus or other indicator of compromise (IOC).

The vulnerability assessment (VA) system may be configured to identify, quantify, and prioritize (e.g., rank) the vulnerabilities of a device. The VA system may be able to catalog assets and capabilities or resources of a device, assign a quantifiable value (or at least rank order) and importance to the resources, and identify the vulnerabilities or potential threats of each resource. The VA system may provide the aforementioned information for use by network monitor entity 102.

The advanced threat detection (ATD) or threat detection (TD) system may be configured to examine communications that other security controls have allowed to pass. The ATD system may provide information about a device including, but not limited to, source reputation, executable analysis, and threat-level protocols analysis. The ATD system may thus report if a suspicious file has been downloaded to a device being monitored by network monitor entity 102.

Endpoint management systems can include anti-virus systems (e.g., servers, cloud based systems, etc.), next-generation antivirus (NGAV) systems, endpoint detection and response (EDR) software or systems (e.g., software that record endpoint-system-level behaviors and events), compliance monitoring software (e.g., checking frequently for compliance).

The mobile device management (MDM) system may be configured for administration of mobile devices, e.g., smartphones, tablet computers, laptops, and desktop computers. The MDM system may provide information about mobile devices managed by MDM system including operating system, applications (e.g., running, present, or both), data, and configuration settings of the mobile devices and activity monitoring. The MDM system may be used get detailed mobile device information which can then be used for device monitoring (e.g., including device communications) by network monitor entity 104.

The firewall (FW) system may be configured to monitor and control incoming and outgoing network traffic (e.g., based on security rules). The FW system may provide information about a device being monitored including attempts to violate security rules (e.g., unpermitted account access across segments) and network traffic of the device being monitored.

The switch or access point (AP) system may be any of a variety of network devices (e.g., network device 106 or aggregation device 108) including a network switch or an access point, e.g., a wireless access point, or combination thereof that is configured to provide a device access to a network. For example, the switch or AP system may provide MAC address information, address resolution protocol (ARP) table information, device naming information, traffic data, etc., to network monitor entity 104 which may be used to monitor entities and control network access of one or more entities. The switch or AP system may have one or more interfaces for communicating with IoT or smart devices or other devices (e.g., ZigBee™, Bluetooth™, etc.), as described herein. The VA system, ATD system, and FW system may thus be accessed to get vulnerabilities, threats, and user information of a device being monitored in real-time which can then be used to determine a risk level of the device.

Aggregation device 108 may be configured to communicate with network coupled devices 114a and 114b and provide network access to network coupled devices 114a and 114b. Aggregation device 108 may further be configured to provide information (e.g., operating system, device software information, device software versions, device names, application present, running, or both, vulnerabilities, patch level, etc.) to network monitor entity 104 about the network coupled devices 114a and 114b. Aggregation device 108 may be a wireless access point that is configured to communicate with a wide variety of devices through multiple technology standards or protocols including, but not limited to, Bluetooth™, Wi-Fi™, ZigBee™, Radio-frequency identification (RFID), Light Fidelity (Li-Fi), Z-Wave, Thread, Long Term Evolution (LTE), Wi-Fi™ HaLow, HomePlug, Multimedia over Coax Alliance (MoCA), and Ethernet. For example, aggregation device 108 may be coupled to the network device 106 via an Ethernet connection and coupled to network coupled devices 114a and 114b via a wireless connection. Aggregation device 108 may be configured to communicate with network coupled devices 114a and 114b using a standard protocol with proprietary extensions or modifications.

Aggregation device 108 may further provide log information of activity and properties of network coupled devices 114a and 114b to network monitor entity 104. It is appreciated that log information may be particularly reliable for stable network environments (e.g., where the types of devices on the network do not change often). The log information may include information of updates of software of network coupled devices 114a and 114b.

Figure 2:
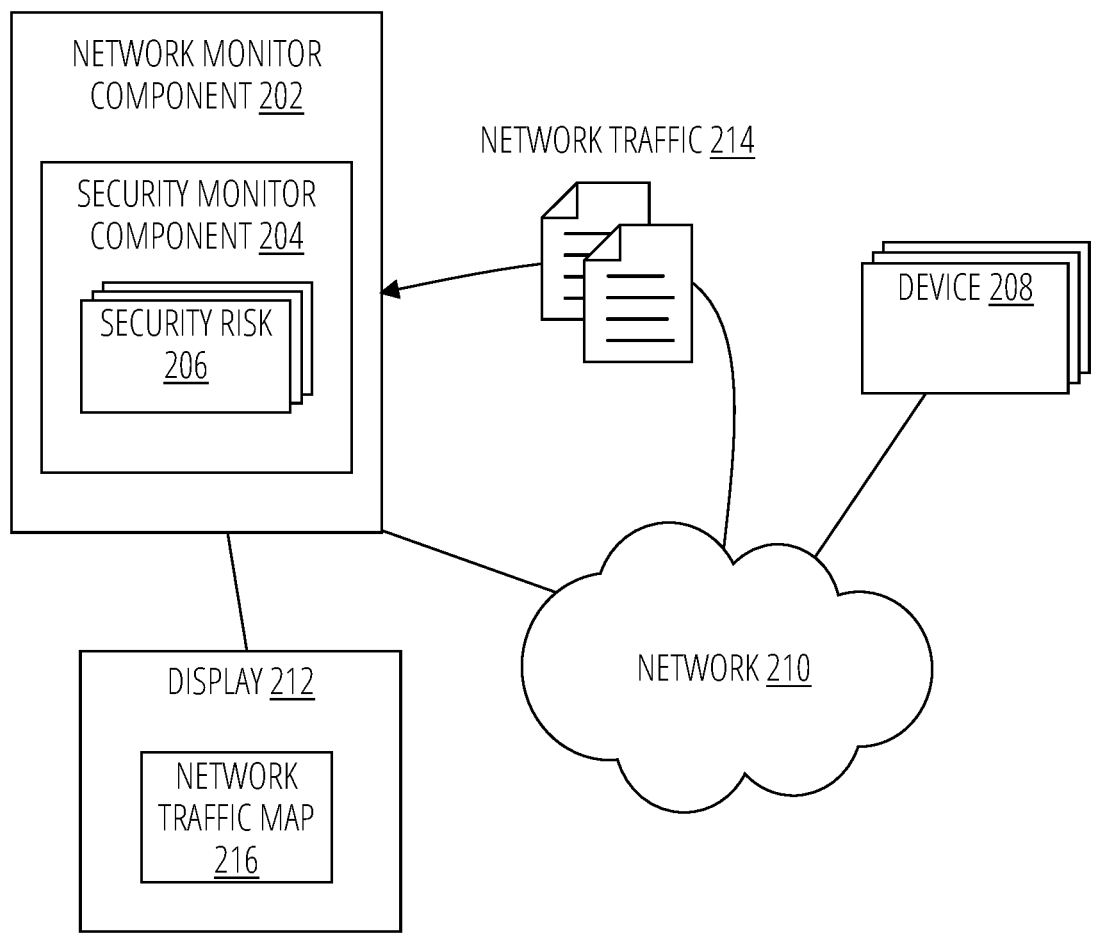
FIG. 2 depicts an example of a computer network in accordance with one implementation of the present disclosure.

FIG. 2 depicts an illustrative computer network with a network monitor component 202 and a security monitor component 204 in accordance with one implementation of the present disclosure. Network 210 may represent a single computer network, or it may represent numerous computer networks which may be interconnected, isolated from each other, or a combination thereof. Each network 210 may include one or more devices 208 that are coupled to the network. The one or more of devices 208 may communicate with each other over the network 210. These devices may include computer servers, IoT devices (e.g., a television, sensors, appliances, medical equipment, exercise equipment, or other IoT device), personal computers, databases, mobile phones, tablet computers, proprietary operational technology (OT), one or more entities, and more. Network 210 may include one or more network devices such as network device 106 (e.g., of FIG. 1).

Network monitor entity 202 (e.g., network monitor entity 104) may be communicatively coupled to the network 210. Network monitor entity 202 may include a security monitor component 204. This component 204 may obtain a security risk 206 for each of a plurality of devices 208 on the network 210 and network traffic 214 of the plurality of devices 208. Security monitor component 204 may present to a display 212, a network traffic map 216 that shows the plurality of devices 208, the network traffic 214, and the security risk 206 for each of the plurality of devices 208. The security monitor component may simulate segmentation of one or more of the plurality of devices 208 on the network 210. The simulated segmentation may include one or more access rules may be applied to one or more of the devices of the plurality of devices 208. The security monitor component 204 may present, to the display 212, the network traffic map 216 with an update of the network traffic 214, an update of the security risk 206 of each of the plurality of devices on the network, or both. The security risk 206 of a given device may change in the simulation, due to the effect of the simulated segmentation or other simulated action. The simulated segmentation may include a segmentation policy which may also include one or more access policies that restrict or change the network traffic flowing into or out of one or more of the devices 208. A simulation may be performed using the same network traffic but with applied segmentation rules that may further limit the flow of data between some devices. Similarly, a simulated patch or other action may address known vulnerabilities of a device, which may cause an improvement to a security risk of a device.

In some examples, the security risk 206 is determined in view of a vulnerability, a criticality, and a behavior of a respective one of the plurality of devices 208 on the network 210. Each of these components may be held separately as values in the security risk 206, or be combined to form a single security risk 206, or both. Each component may have respective weights that may emphasize one component over another in determining an overall security risk of the device. For example, criticality may be assigned a higher weight than vulnerability and behavior. In some examples, a user may adjust the weights of a component to determine which component to emphasize. In such a manner, network monitor entity 202 may respond to user preferences that may emphasize any one of the components over another component in determining the security risk of a given device.

The security monitor component 204 may determine the vulnerability based on factors such as the operating system or applications running on the respective device, a state of the ports of the respective device, what patches have been applied to the respective device, the operating system type, a version of the operating system, or a combination of such factors. For example, a given device may be identified as having an operating system with version 'X' that is vulnerable to various attack unless it installs patches 'A', 'B' and 'C'. The security monitor component 204 may determine the vulnerability for that device in view of which patches that device has and the version of the operating system of that device.

The security monitor component 204 may determine the criticality of the respective device based on factors such as the type of device (e.g., a printer, a proxy, etc.), the criticality of the data that is held on the device, the services which are provided by the device, or a combination of such factors. For example, a printer may have lower criticality than a proxy server. A device holding sensitive user data (e.g., healthcare related) may have a higher criticality than a device that holds weather records.

The security monitor component 204 may determine a behavior score of the respective device based on factors such as network traffic, logs, or a combination of such factors. The behavior indicates what the device is doing on the network. For example, negative behavior may be indicated in network traffic or logs that show that the device is sharing large amounts of data to many different devices, or overloading the network with messages, or not being responsive.

The security monitor component 204 may apply a summing or averaging algorithm which may weight various factors (such as those discussed, or others) to determine the vulnerability, criticality, or behavior score for a given device. The security risk of a given device may also be understood as an overall security risk of the device, which may be a summation, average, or other value that is calculated in view of the vulnerability, criticality, and the behavior component. In some examples, the security risk may include a score for each component and an overall security score determined in view of the components.

In some examples, the vulnerability, the criticality, and the behavior of the respective one of the plurality of devices is determined periodically, based on periodic performance of discovery, device classification, analysis of the network traffic, or a combination thereof. For example, security monitor component 204 may periodically perform discovery that determines which devices 208 are present on network 210. Security monitor component 204 may classify each of the devices 208, which may include determining what type of device each device is (e.g., a printer, a web-server, medical equipment, etc.), the address of each device, services that run on the device, ports that are open on each device, an operating system that runs on the device, what version of operating system is running on the device, what patches have been applied to each device, and so on. In some aspects, the classification of a device may include determining an operating system, a function, and a device type of a given device. For example, classification may determine if a device is a network address translation (NAT) device, a printer, a VoIP device, networking equipment (e.g., a local area network (LAN) controller, router, a switch, or other network device), a storage device, Windows, Macintosh, Linux, Unix, a mobile device, a medical device, or other function, operating system, or device type. The classification of the device may include a combination of such information. Discovery and classification may be performed by security monitor component 204 using passive or active techniques, such as by analysis of network traffic, polling, an agent, a third party service, or other techniques.

In some examples, the security monitor component 204 may present to the display 212 a suggested segmentation (which may be understood as a segmentation policy) to perform the segmentation of one or more of the plurality of devices on the network. The suggested segmentation may be determined by security monitor component 204 in view of the security risk 206 of each of the plurality of devices 208 on the network 210. In some examples, the security monitor component 204 may present to the display 212, a plurality of suggested segmentations that groups the plurality of devices in view of the security risk of each of the plurality of devices. For example, a set of actions may be suggested to address devices identified as having a security risk range of 'A' to 'B'. A second sent of actions may be suggested to address devices identified as having a security risk range of 'B' to 'C', and so on.

The plurality of suggested segmentations may be ordered to incrementally group the plurality of devices. The suggested segmentations may be determined in view of the security risk of each device 208 in addition to other factors such as classification, device type, device group, or a combination of such factors. One of the suggested segmentations may isolate one of the plurality of devices that is deemed as critical from a second of the plurality of devices that is deemed as being vulnerable or with negative behavior.

In some examples, the security monitor component 204 may present to the display 212 a suggested patch or a suggested update for one or more of the devices 208. The patch or update may be determined in view of the security risk of each of the plurality of devices on the network. In some examples, the security monitor component 204 may reference a repository or table that includes patches or updates in view of the classification of the device.

In some examples, the security monitor component 204 may receive a user input to set a threshold security risk for one or more of the plurality of devices on the network 210. For example, a user may specify that a device A is to have a threshold security risk of 'X' or lower. In response to the threshold being exceeded, the security monitor component 204 may raise a notification to the user and suggest a segmentation of one or more of the devices 208 to mitigate the security risk. The suggested segmentation may include separating device A from other devices. The suggested segmentation may be determined in view of the security risk, or components of the security risk, such as the criticality, behavior, or vulnerability of a device. For example, if device A is deemed to have a high criticality, the security monitor component 204 may suggest a segmentation that separates device A from devices that are deemed to have a high risk behavior or deemed to be vulnerable, or both. Criticality, behavior, and vulnerability may each have an associated threshold that the security monitor component 204 may use to determine if a given device is critical, exhibits negative behavior, or is vulnerable.

In some examples, the security monitor component 204 may automatically (e.g., performed by a computing device without a human or user input) segment the network 210 based on one or more conditions. For example, in response to a security risk 206 of one of devices 208 satisfying or exceeding a threshold, the security monitor component 204 may segment (e.g., automatically) the network to isolate that one device 208, or group that one device 208 with other devices that share the same security risk grouping. For example, device A may be grouped with device B based on both having a security risk that falls within a common range. Device C may be grouped with device D based on both having a security risk that falls within a different range, and so on. The groupings may be determined based on other factors as well, such as by location, device type, etc., as described. A user may configure a setting that may automatically segment the network, provide segmentation suggestions, or both.

In some examples, the security monitor component 204 may present the security risk 206 of each of the plurality of devices 208 on the network 210 as a heat map. The heat map may show a magnitude of the security risk 206 based on color, intensity, hue, or other visual indication. A heat map 'gradient' may show how the security risk of the various devices are distributed over different regions of the network 210. In some cases, the network 210 may include multiple networks that may form a user's enterprise. As such, the heatmap may show where security risks lie in the user's enterprise at a high level.

The security monitor component 204 may adapt to a continuous change of each device and its associated security risk. The security monitor component 204 may provide updated segmentation monitoring, simulation, and suggestions to dynamically adapt to the change in devices over time. The security monitor component 204 may consider not only device types or a physical location of the device, but also incorporate the risk that each device poses to the network at a given moment, and may segment it accordingly.

Security monitor component 204 provides enhanced segmentation (including segmentation automation), and incorporates the security risk 206 as a basis for the segmentation. Security risk 206 may be understood as a score, or a collection of scores. The security monitor component 204 may perform or suggest segmentation in view of the security risk of each device 208, in addition to the other factors that segmentation may be performed based on (e.g., classification, device group, etc.). By combining real-time cyber security risk scoring and a clear network traffic map of the enterprise, the security monitor component 204 provides users with the information to properly prioritize their segmentation activities, which may include actionable and gradual steps (e.g., suggestions). These actionable steps may be implemented by the security monitor component 204 to reduce the overall security risk of the devices 208 on the network 210.

In some embodiments, devices 208 may be grouped based on security risk in addition to device type or other segmentation factors to allow for more advanced segmentation. For example, a device that communicates with a risky device can be segmented from other devices. The group of devices may be displayed in a prioritized manner based on security risk or a component of the security risk (e.g., based on the criticality, vulnerability, or behavior).

Security monitor component 204 integrates risk scoring with segmentation in a manner that leverages continuous discovery, classification, and device assessment, to help users dynamically segment their network. Discovery, classification, and device assessment may be performed by security monitor component 204 without agents or active techniques (e.g., polling) that could compromise business operations. In some examples, security monitor component 204 may leverage a variety of different active and passive monitoring techniques across wired, wireless, VPN, virtual and software-defined networks, while avoiding disrupting devices that are sensitive to active scanning techniques.

Figure 3:
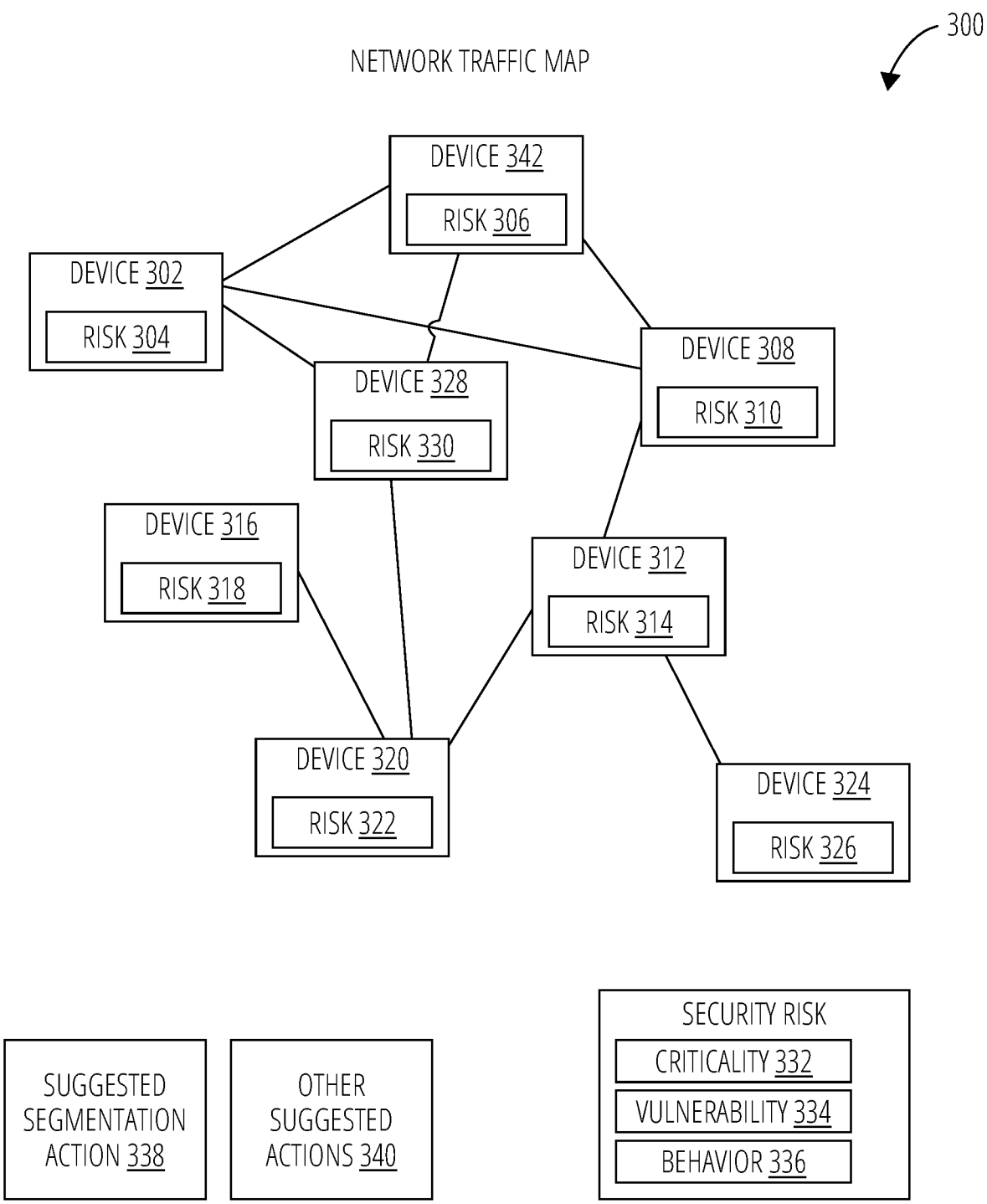
FIG. 3 shows an example network traffic map with security risk in accordance with one implementation of the present disclosure.

FIG. 3 shows an example network traffic map 300 with security risk in accordance with one implementation of the present disclosure. Network traffic map 300 may be visually presented on a display, by a network monitor component (e.g., 104 and 202) as described in FIG. 1 or FIG. 2. Network traffic may be obtained that includes communications from or to each device on a network over a period of time. Network traffic map 300 visually depicts these communications between each device on a network.

For example, a plurality of devices such as device 302, device 342, device 308, device 328, device 312, device 316, device 320, and device 324 may each be visually represented as a node in network traffic map 300. Edges may be drawn between some of the devices, to represent communication between the devices, as captured in the network traffic. For example, a collection of network traffic, which may be captured by a network device 106 or another device, may indicate that device 302 communicates one or more packets to device 308. As such, an edge is drawn between device 302 and device 308. In some examples, although not shown as such, an edge may be drawn with an indicator (e.g., an arrow or diamond) that indicates a direction of the communication.

Further, each device may be shown with its respective security risk. For example, device 302 is shown with security risk 304, device 342 is shown with security risk 306, device 308 is shown with security risk 310, device 328 is shown with security risk 330, device 316 is shown with security risk 318, device 312 is shown with security risk 314, device 320 is shown with security risk 322, and device 324 is shown with security risk 326. The security risk may be visually overlaid on each device to provide a strong visual indication of where the security risks (e.g., largest or lowest risks) are present. The security risk may be visually shown with a symbol, a color, or other visual indication. In some examples, a symbol or color may indicate when the security risk of a device exceeds a threshold. The symbol or color may be different, or absent, when the respective threshold is not exceeded.

In some cases, each component of the security risk may also be visually indicated in the network traffic map 300. For example, criticality 332 may have a first symbol, vulnerability 334 may have a second symbol, and behavior 336 may have a third symbol. If a component for a given device exceeds a threshold, then that component may be indicated visually upon the device on the network traffic map 300, with the respective symbol or other visual indicator. It should be understood that the graphical representations of objects shown in the network traffic map 300 are merely an example and that each of the objects may be represented in a different manner (e.g., with a different symbol or shapes) without departing from the scope of the present disclosure.

As described, the network traffic map 300 may be shown as a heatmap that may indicate a clustering or absence of security risk, components of the security risk, or both, with respect to a region of the network. As such, a user may visually see where security risks are present or absent in a given network.

One or more suggested segmentation actions 338 may be presented to the user. A segmentation action may include an option to simulate a suggested segmentation policy. The suggested segmentation action may be determined in view of the security risk of each device. For example, the security monitor component 204 may receive a user input to simulate a select segmentation policy. In response, the security monitor component may perform a simulation using the same or different network traffic that was used to gene rate the network traffic map 300, in view of the select segmentation policy. The security monitor component 204 may simulate communications between the devices with the applied segmentation policy, which may limit how one or more of the devices communicate with each other (e.g., by implementing an access rule or filter in a network device). The security monitor component may update network traffic map 300, and present that to the user on the display. Further, the security monitor component may recalculate the security risk for each device. In particular, the behavior component of the security risk for a given device may change in view of the change in communication flow that results from the segmentation of the network. The security monitor component may overlay the updated security risk for each device on the network traffic map 300.

In some cases, the suggested segmentations may be determined based on one or more settings. For example, a setting may specify that a device of type 'printer' should be separated from critical devices. The security monitor component 204 may present a suggested segmentation action 338 to a user that separates a printer from critical devices. The security monitor component may expose the one or more settings to a user to let the user configure the behavior of the suggestions.

Other suggestions 340 may also be determined in view of the security risks, device classifications, vulnerabilities, the network traffic, or a combination thereof. For example, a patch maybe suggested for device 316 in view of device 316 having a known vulnerability 334 based on its device classification.

Figure 4:
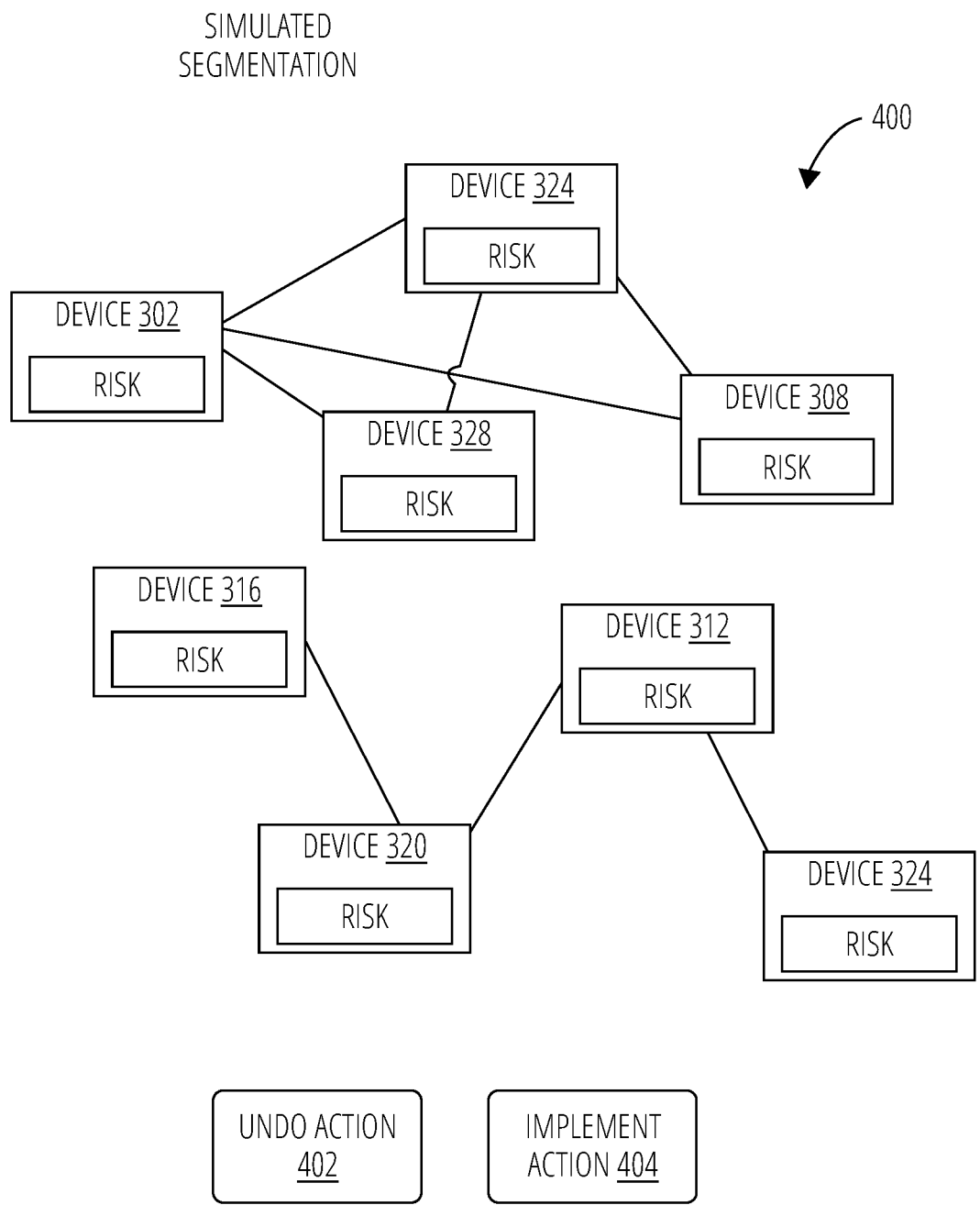
FIG. 4 shows an example network traffic map with security risk and simulation in accordance with one implementation of the present disclosure.

FIG. 4 shows an example network traffic map with security risk and simulation in accordance with one implementation of the present disclosure. Network traffic map 400 may be an example of an updated network traffic map 300, after a simulation is performed by the user (or automatically) with one or more of the suggested segmentation actions or other suggested actions being enforced in the simulation.

In this example, the security monitor component may have suggested and enforced a segmentation that reduces or blocks communication between device 328 and 320, and between device 308 and device 312. As described, this suggestion may be prioritized based on which device or devices have the highest security risk. In some examples, device 320 and device 312 may have had the highest security risks in FIG. 3, which triggers the security monitor component to suggest a segmentation policy that reduces contact to those devices. Other factors may also influence the order in which segmentation policies are suggested to a user, such as the device types, settings, and more.

In some examples, device 328 may have been classified as a 'printer'. The security monitor component may include logic that suggests a segmentation policy to separate a 'printer' or other device type from a device which has been deemed as having a high security risk, or a high criticality.

In another example, device 308 may have been deemed as having exhibited negative behavior or vulnerability. Device 312 may have been deemed as being critical. The security monitor component may include logic that suggests a segmentation policy to separate any device deemed as being vulnerable or having a negative behavior from another device that is deemed as critical.

The traffic map 400 is shown with updated traffic flow with the simulation of one or more segmentations. The simulation may be performed by acting out communications between the discovered devices on the network. The simulation may use the same network traffic as used in the non-simulated network traffic map of FIG. 3, additional network traffic data, or a combination of the same network traffic data and the additional network traffic data. Further, given that some of the security risk may depend on a device's incoming and outgoing communications, the security risk of at least some of the devices on the network may change in response to the segmentation policy in the simulation. For example, the security risk of device 320 may reduce in the simulation, due to reduced incoming or outgoing communication with device 328. The simulation may include recalculating the security risk for each device in view of the updated traffic flow, and presenting those updated security risks, if changed.

In such a manner, the security monitor component may provide a suggested segmentation action and simulate the segmentation action using real network traffic between devices on the network. The user may see the simulated result, gain confidence in the approach, and decide to enforce the segmentation on the network. The user may provide a user interface 404 such as a selectable option, a button press, a voice command, etc., that indicates to the security monitor component (e.g., 204) that the user agrees to move forward with performing the segmentation on the network. In response, the security monitor component 204 may enforce the segmentation policy through described operations (e.g., via a network device 106, one or more enforcement points, etc.). Further, the security monitor component 204 may show an updated network traffic map to the user with segmentation being enforced on the actual network, so that the user may confirm behavior of the network with the segmentation policy enforced. The security monitor component may suggest an additional segmentation policy. Thus, the security monitor component 204 may provide actionable steps to a user to gradually improve security of a network through segmentation.

In some examples, the security monitor component 204 may store the enforced segmentation policies. These may be stored the order in which they are implemented. The security monitor component may provide another user interface 402 which may receive input from a user to undo one or more of the previously implemented segmentation policies. As such, a user may be confident in starting or continuing their segmentation policy strategy, knowing that they can visually assess the impact of a given segmentation policy and can undo the action, thereby returning the network to its prior form if necessary.

Further, the security monitor component 204 may continue to provide additional segmentation suggestions and other suggestions in view of the calculated security risk of each device, which may be performed in a continuous manner in view of updated discovery, classification, and assessment of devices, and with updated network traffic. In such a manner, the security monitor component 204 may provide suggestions that dynamically adjust to reflect the current state of the network.

Figure 5:
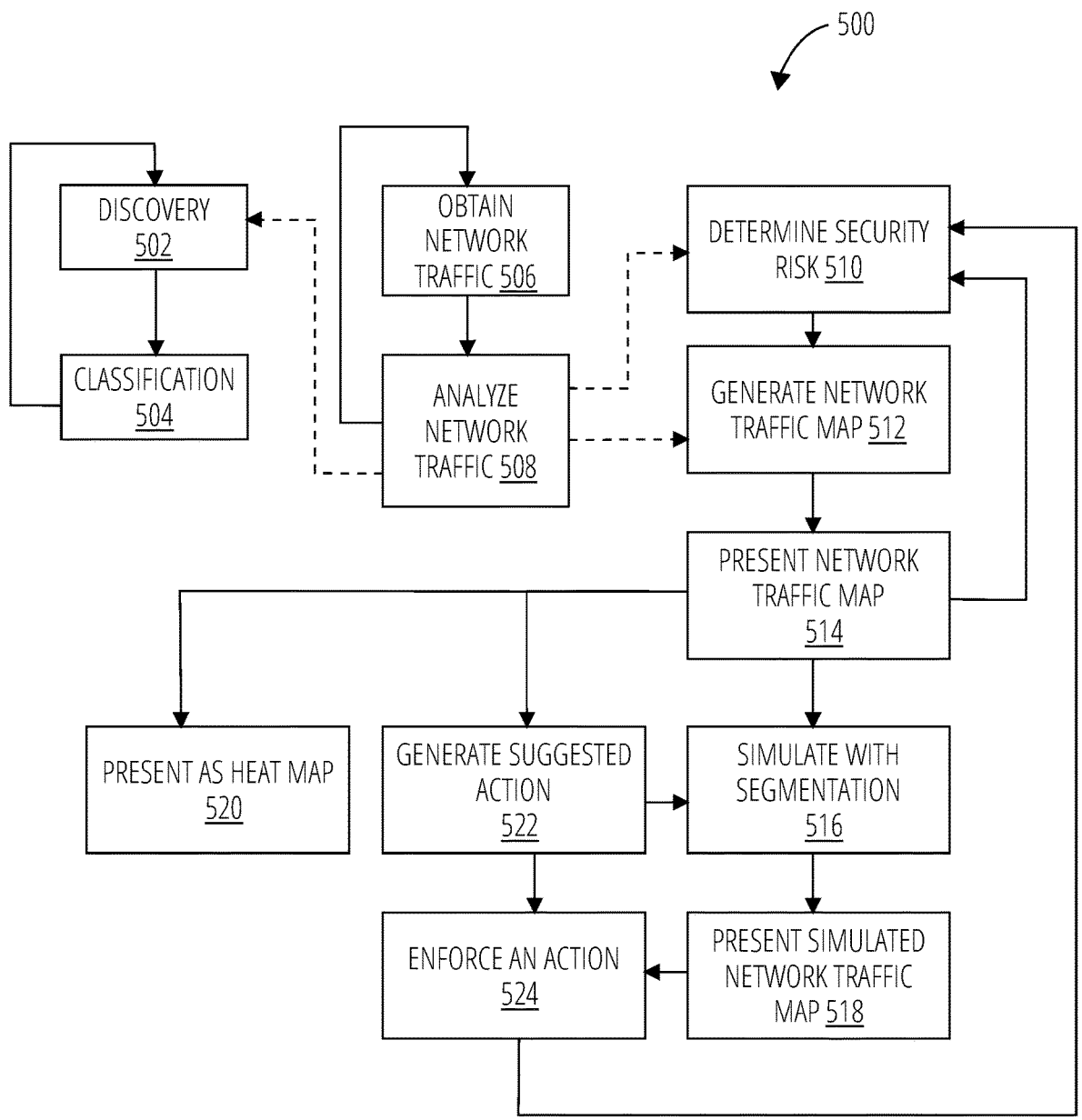
FIG. 5 shows an example process with risk driven planning and simulation for a computer network with one implementation of the present disclosure.

FIG. 5 shows an example process with risk driven planning and simulation for a computer network with one implementation of the present disclosure. Some or all of process 500 may be performed by one or more components (e.g., components of system 600) of an entity or device (e.g., network monitor entity 104, 202, security monitor component 204, etc.).

At block 502, the process may include performing discovery on one or more networks. In some examples, the process may focus on one network. In other examples, the process may perform discovery across an enterprise that spans multiple networks. The scope of discovery may be defined by one or more settings, which may be user configurable. The discovery process collects information over the one or more networks to discover which devices are present on the network.

At block 504, the process may include performing classification on each of the discovered devices. Once the devices are known, the data on each device may be determined by individually polling each device through a compatible protocol, by obtaining classifications of data on each device through a third party device, through obtaining and parsing network traffic, or a combination thereof. This may include determining a type of the device (e.g., a printer, a proxy server, etc.), the services that are available on the device, the ports that are open on the device, the operating systems, and patches that are on the device, or other classification information.

New devices may be connected or communicatively coupled to the network, devices may be removed, patches may be uploaded, new vulnerabilities may be identified, etc. The discovery and classification operations at block 502 and 504 may be performed repeatedly (e.g., periodically) to understand the state of the network as it may change over time.

At block 506, the process may include obtaining network traffic. This may be performed actively or dynamically by one or more network devices 106. In some cases, the network traffic may be obtained from a third party device. At block 508, the network traffic may be analyzed to determine the flow of data between the various devices on the one or more networks. Discovery (at block 502) or classification (at block 504) may, in some cases, include analysis of network traffic at block 508. For example, the network traffic analysis may help to indicate which ports are used on a given device, or what communication protocols a given device uses, the type of services that are provided by a device, or other classification information.

At block 510, the process includes determining a security risk for each of a plurality of devices on a network. The security risk may be determined in view of a vulnerability, a criticality, and a behavior of a respective one of the plurality of devices on the network. In some aspects, as described, the security risk may include three components combined as a sum, an average, a weighted sum, or a weighted average. In some aspects, the security risk may include all three components separately. In some aspects, the security risk may include a combined security risk and separate components. In such a manner, the security risk may be assessed holistically on a network traffic map, while also providing for targeted control of the network based on some of the components. For example, the process may separate devices deemed as critical from other devices deemed as being vulnerable or exhibiting negative behavior.

At block 512, the process may generate a network traffic map. This may include obtaining the network analysis determined at block 508 and the discovery and classifications performed at blocks 502 and 504, to draw each device that is discovered on the one or more networks, and to draw edges to and from each of the devices as indicated by the network traffic.

Each device may be visually tagged with the security risk, which may be visually indicated with one or more numbers, a color, a symbol, etc. Further, each component of the security risk may also be indicated. For example, if the overall security risk of a device exceeds a threshold, this may be indicated with a first indicator (e.g., red), and if any of the individual components exceeds a threshold, this may be indicated with a second (e.g., yellow), third (e.g., orange), or fourth indicator (e.g., brown). As such, the generated network traffic map comprises network traffic between the plurality of devices and the security risk for each of the plurality of devices.

At block 514, the process may present the network traffic map to a display. The display may be a computer display, a touchscreen display on a mobile device, or other display. The network traffic map may include computer graphic representations of each device (e.g., a node) and the network traffic to and from each device (e.g., an edge). The network traffic may be indicated with direction in some cases. Other visual indicators (e.g., edge thickness, color, opacity, etc.) may indicate how heavy or light a particular communication path is. For example, a path with heavy network traffic may be indicated with a thick edge, a bright color, high opacity, etc. Conversely, a path with light network traffic may be indicated with a thin edge, a faint color, or low opacity.

In some examples, the network traffic map may, at block 520, be presented as a heat map. This operation may be performed while presenting an enterprise level network map to the user. The enterprise level network map may include a plurality of networks. In some examples, the enterprise level network map emphasizes clusters of security risk.

In some examples, a user may 'zoom out' of the network traffic map, and security risk between devices that are clustered (e.g., co-located or communicate with each other) may be averaged. The user may 'zoom in' and the security risk may be shown in more detail, e.g., for each device or an average of a smaller cluster of devices. Further 'zooming in' may show the security risk for devices on a component level. As such, a user may zoom out to assess where in the enterprise to begin or continue on the path of risk reduction, and zoom in to assess particular problem areas in the network.

At block 516, the process includes simulating segmentation of one or more devices on the one or more networks. In some examples, block 516 may be performed in response to a user input. For example, at block 522, the process may generate one or more suggested actions (e.g., apply a patch, segmentation, software or OS update, etc.). The user may provide input to perform one of the suggested actions, or a different action. The process may proceed to block 516 and simulate communications between the devices, while virtually enforcing one or more segmentation policies as defined by the action.

At block 518, the process may present the network traffic map to the user, with the simulated network traffic between the devices that result from the enforced action. Further, the security risk of each device may change, as a result of the difference in traffic flow, or as a result of an applied patch, software update, or other action.

In some examples, the simulated network traffic map may be shown as an overlay on the network traffic map from block 514, which is representative of actual network traffic flow. The simulated network traffic map may be shown with different color, opacity, or other visual element, as compared to the network traffic map from block 514. In such a manner, the process may clearly indicate to a user, the impact of a particular action (e.g., a segmentation, a patch, or other action) on the existing one or more networks, by showing a 'before and after'.

At block 524, the process may include enforcing one or more actions. This may be performed in response to user input. For example, after simulating a segmentation, a patch, an update, or other action, and viewing the results in the updated network traffic map, the user may decide to perform this action on the network. The process may receive a user input (e.g., a selection or 'apply action' button press) and apply the action to the network (e.g., through one or more network devices 106, network enforcement points, etc.).

Some of the blocks may be performed asynchronously and independent from others. For example, process 500 may perform blocks 502 and 504 asynchronous from blocks 506 and 508. Similarly, blocks 510 to 524 may also be performed asynchronous from the other blocks. As such, a network traffic map may be generated and presented using updated and current device classification and network traffic. Further, the process may update the network traffic map periodically or after an action is performed, to provide an accurate and current representation of the network to the user.

Figure 6:
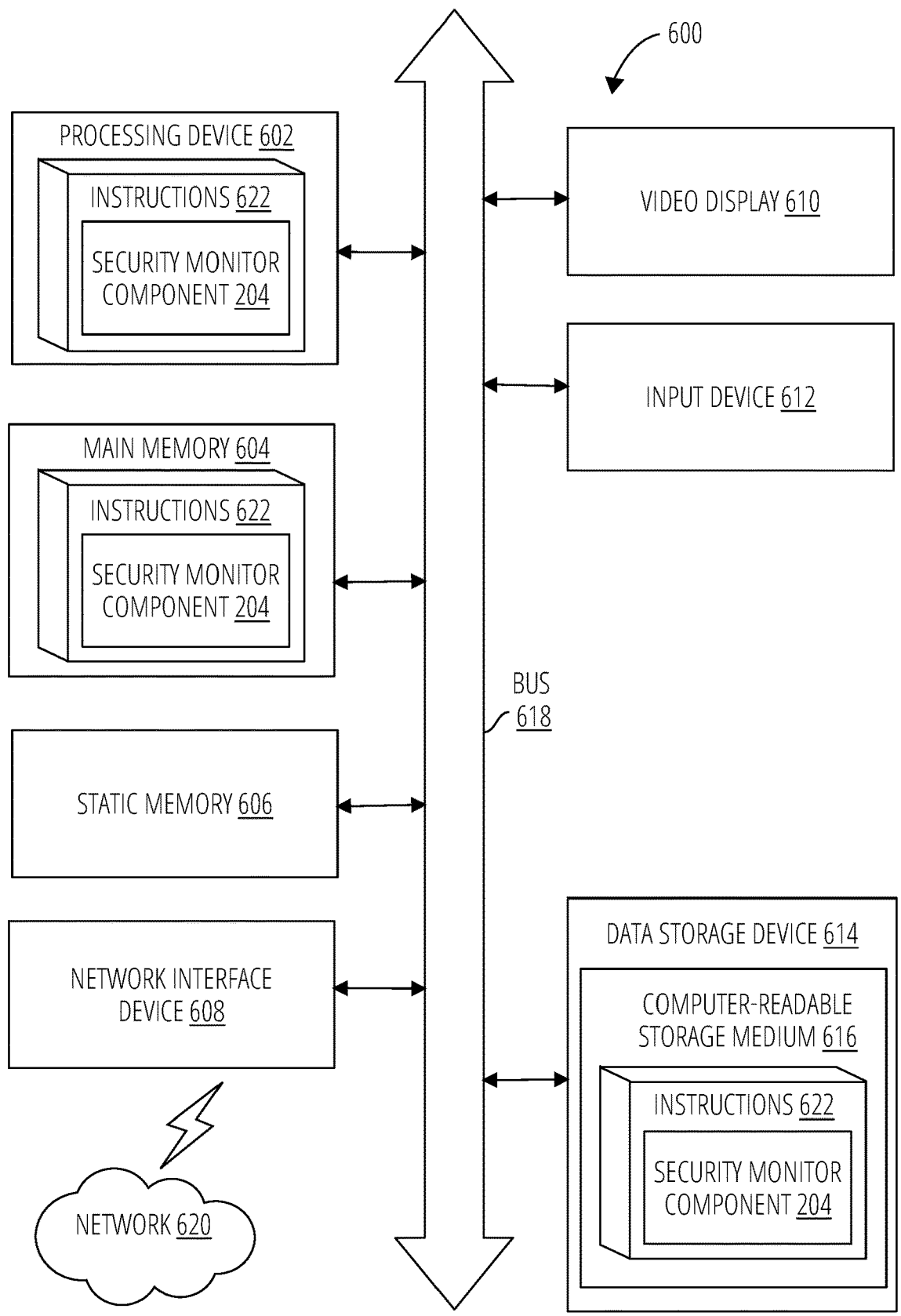
FIG. 6 is a block diagram illustrating an example computer system, in accordance with one implementation of the present disclosure.

FIG. 6 is a block diagram illustrating an example computer system 600, in accordance with one implementation of the present disclosure. This can be understood as a diagrammatic representation of a machine in the example form of a computer system within which a set of instructions, for causing the machine to perform any one or more of the methodologies discussed herein, may be executed. For example, the computing device may determine a security risk for each of a plurality of devices on a network. The computing device may present, to a display, a network traffic map that comprises network traffic between the plurality of devices and the security risk for each of the plurality of devices. The computing device may simulate segmentation of one or more of the plurality of devices on the network, and present, to the display, the network traffic map with an update to the network traffic between the plurality of devices or an update to the security risk of one or more of the plurality of devices on the network or an update to both. In alternative embodiments, the machine may be connected (e.g., networked) to other machines in a local area network (LAN), an intranet, an extranet, or the Internet.

The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine.

Further, while only a single machine is illustrated, the term "machine" shall also be taken to include any collection of machines that individually or jointly execute a set (or multiple sets) of instructions to perform any one or more of the methodologies discussed herein. In some embodiments, computer system 600 may be representative of a server, such as network monitor entity 104, 202 running a security monitor component 204 as described herein.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 614, which communicate with each other via a bus 618. Any of the signals provided over various buses described herein may be time multiplexed with other signals and provided over one or more common buses. Additionally, the interconnection or coupling between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured as security monitor component 204, as discussed herein.

The data storage device 614 may include a machine-readable computer-readable storage medium 616, on which is stored one or more set of instructions 622 (e.g., software) embodying any one or more of the methodologies of operations described herein, including instructions to cause the processing device 602 to execute security monitor component 204. The instructions 622 may also reside, completely or at least partially, within the main memory 604 or within the processing device 602 during execution thereof by the computer system 600; the main memory 604; and the processing device 602 also constituting machine-readable storage media. The instructions 622 may further be transmitted or received over a network 620 via the network interface device 608.

The computer system 600 also may include a video display unit 610 (e.g., a liquid crystal display (LCD) or a cathode ray tube (CRT)) and an input device 612 (e.g., a keyboard or mouse). In one embodiment, video display unit 610 and input device 612 may be combined into a single component or device (e.g., an LCD touch screen).

A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

When an action, function, operation, etc., is described herein as being performed automatically, this may indicate that the action, function, operation, etc., may be performed without requiring human or user input, invocation, or interaction.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion.

As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances.

In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   determining a security risk for each of a plurality of devices on a network;
   presenting, to a display, a network traffic map that comprises network traffic between one or more of the plurality of devices and the security risk for each of the plurality of devices;
   presenting, to the display, one or more suggested segmentations that are determined in view of the security risk of each of the plurality of devices, wherein the one or more suggested segmentations are ordered to group the plurality of devices in view of the security risk, wherein one of the one or more suggested segmentations isolates the one or more of the plurality of devices that is deemed as critical from a second of the plurality of devices that is deemed as being vulnerable or exhibiting negative behavior;
   simulating, based on the network traffic between the one or more of the plurality of devices in the network traffic map, segmentation of the one or more of the plurality of devices on the network resulting in simulated network traffic and a simulated security risk of the one or more of the plurality of the devices on the network; and
   presenting, to the display, the network traffic map comprising the network traffic prior to the simulating, alongside the simulated network traffic between the one or more of the plurality of devices and the simulated security risk of the one or more of the plurality of devices on the network, wherein the simulated network traffic is displayed as an overlay to the network traffic prior to the simulating.

2. The method of claim 1, wherein the security risk is determined in view of at least one of: a vulnerability, a criticality, or a behavior of a respective one of the plurality of devices on the network.

3. The method of claim 2, wherein the vulnerability, the criticality, and the behavior of the respective one of the plurality of devices is determined periodically, based on periodic performance of device, classification, and analysis of the network traffic.

4. The method of claim 1, further comprising:
   presenting, to the display, a suggested patch or a suggested update, determined in view of the security risk of each of the plurality of devices on the network.

5. The method of claim 4, wherein simulating the segmentation of the one or more of the plurality of devices on the network is performed in response to a user input that selects a suggested segmentation in the one or more suggested segmentations or the suggested patch.

6. The method of claim 1, further comprising:
   displaying the security risk of each of the plurality of devices on the network as a heat map.

7. A system, comprising:
   a memory; and
   a processing device, operatively coupled to the memory, to:
   determine a security risk for each of a plurality of devices on a network;
   present, to a display, a network traffic map that comprises network traffic between one or more of the plurality of devices and the security risk for each of the plurality of devices;
   present, to the display, one or more suggested segmentations that are determined in view of the security risk of each of the plurality of devices, wherein the one or more suggested segmentations are ordered to group the plurality of devices in view of the security risk, wherein one of the one or more suggested segmentations isolates the one or more of the plurality of devices that is deemed as critical from a second of the plurality of devices that is deemed as being vulnerable or exhibiting negative behavior;
   simulate, based on the network traffic between the one or more of the plurality of devices in the network traffic map, segmentation of the one or more of the plurality of devices on the network resulting in simulated network traffic and a simulated security risk of the one or more of the plurality of the devices on the network; and
   present, to the display, the network traffic map comprising the network traffic prior to the simulating, alongside the simulated network traffic between the one or more of the plurality of devices and the security risk of the one or more of the plurality of devices on the network, wherein the simulated network traffic is displayed as an overlay to the network traffic prior to the simulating.

8. The system of claim 7, wherein to determine the security risk, the processing device is to determine the security risk in view of at least one of: a vulnerability, a criticality, or a behavior of a respective one of the plurality of devices on the network.

9. The system of claim 8, wherein the vulnerability, the criticality, and the behavior of the respective one of the plurality of devices is determined periodically, based on periodic performance of device, classification, and analysis of the network traffic.

10. The system of claim 7, wherein the processing device is further to:
    present, to the display, a suggested patch or a suggested update, determined in view of the security risk of each of the plurality of devices on the network.

11. The system of claim 10, wherein to simulate the segmentation of the one or more of the plurality of devices on the network, the processing device is to simulate the segmentation of the one or more of the plurality of devices on the network in response to a user input that selects a suggested segmentation in the one or more suggested segmentations or the suggested patch.

12. The system of claim 7, wherein the processing device is further to:
    display the security risk of each of the plurality of devices on the network as a heat map.

13. A non-transitory computer readable medium having instructions encoded thereon that, when executed by a processing device, cause the processing device to:
    determine a security risk for each of a plurality of entities on a network;
    present, to a display, a network traffic map that comprises network traffic between one or more of the plurality of entities and the security risk for each of the plurality of entities;

present, to the display, one or more suggested segmentations that are determined in view of the security risk of each of the plurality of devices, wherein the one or more suggested segmentations are ordered to group the plurality of devices in view of the security risk, wherein one of the one or more suggested segmentations isolates the one or more of the plurality of devices that is deemed as critical from a second of the plurality of devices that is deemed as being vulnerable or exhibiting negative behavior;

simulate, based on the network traffic between the one or more of the plurality of devices in the network traffic map, segmentation of the one or more of the plurality of entities on the network resulting in simulated network traffic and a simulated security risk of the one or more of the plurality of the entities on the network; and present, to the display, the network traffic map comprising the network traffic prior to the simulating, alongside the simulated the network traffic between the plurality of entities and the simulated security risk of the one or more of the plurality of entities on the network, wherein the simulated network traffic is displayed as an overlay to the network traffic prior to the simulating.

14. The non-transitory computer readable medium of claim 13, wherein to determine the security risk, the instructions, when executed by the processing device, cause the processing device to determine the security risk in view of at least one of: a vulnerability, a criticality, or a behavior of a respective one of the plurality of entities on the network.

15. The non-transitory computer readable medium of claim 14, wherein the vulnerability, the criticality, and the behavior of the respective one of the plurality of entities is determined periodically, based on periodic performance of device, classification, and analysis of the network traffic.

16. The non-transitory computer readable medium of claim 13, wherein the instructions, when executed by the processing device, cause the processing device further to:

present, to the display, a suggested patch or a suggested update, determined in view of the security risk of each of the plurality of devices on the network.

17. The non-transitory computer readable medium of claim 16, wherein to simulate the segmentation of the one or more of the plurality of devices on the network, the instructions, when executed by the processing device, cause the processing device to simulate the segmentation of the one or more of the plurality of devices on the network in response to a user input that selects a suggested segmentation in the one or more suggested segmentations or the suggested patch.

18. The non-transitory computer readable medium of claim 13, wherein the instructions, when executed by the processing device, cause the processing device further to:

display the security risk of each of the plurality of devices on the network as a heat map.

* * * * *